Oct. 10, 1950     H. M. GEYER     2,525,260
PROPELLER CONTROL

Filed Dec. 23, 1946     3 Sheets-Sheet 1

INVENTOR
Howard M. Geyer
BY
Spencer, Hardman & Fehr
His ATTORNEYS

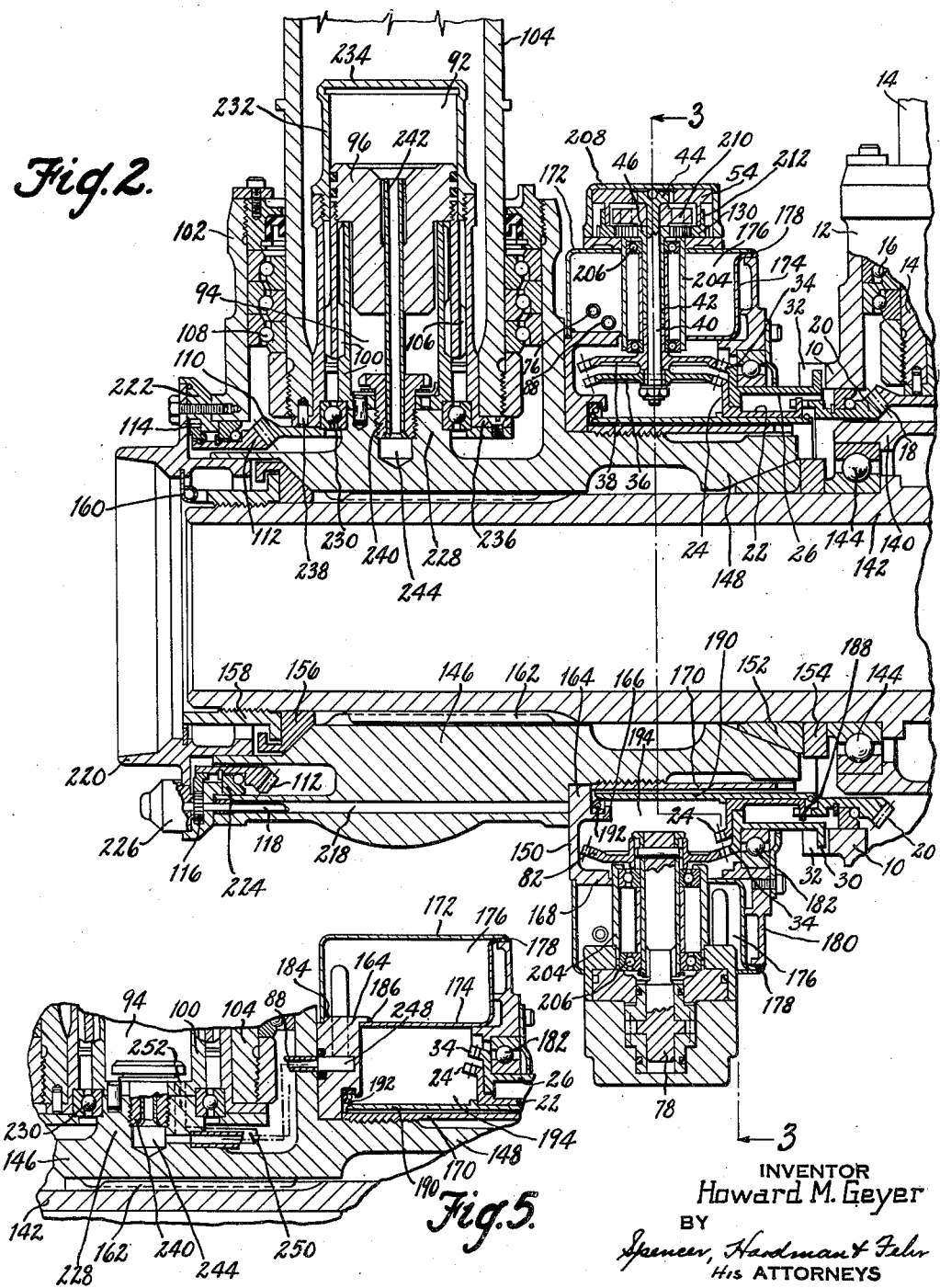

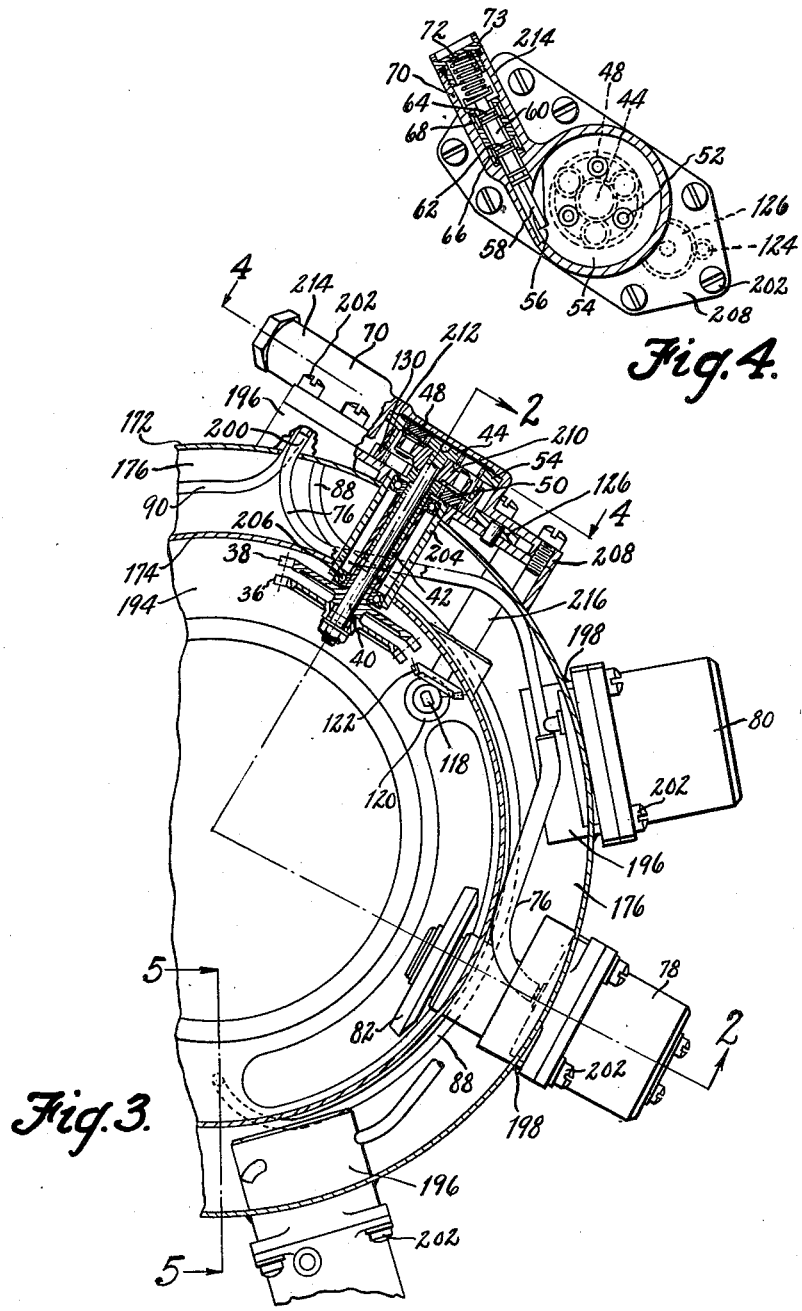

Patented Oct. 10, 1950

2,525,260

UNITED STATES PATENT OFFICE 2,525,260

PROPELLER CONTROL

Howard M. Geyer, Dayton, Ohio, assignor to General Motors Corporation, Detroit, Mich., a corporation of Delaware Application December 23, 1946, Serial No. 717,911

4 Claims. (Cl. 170—135.27)

1

This invention relates to the coordination of the blades of two contra-rotating coaxial propellers, and has for an object to effect the shift of the blade pitch in one propeller in response to the shift of the blades of the other propeller.

Another object of the invention is to provide a propeller control mechanism compact in arrangement, and efficient and reliable in operation that will closely control blade pitch with fidelity to predetermined standards.

Another object of the invention is to provide a propeller control mechanism susceptible of manufacture and assembly as a compact unit for mounting and removable from a propeller regulator without tear-down of the rest of the propeller assembly.

Yet another object of the invention is to provide a compact gear train associated with a fluid pressure control valve for administering fluid pressure to motive units of a blade shifting device in response to differential movement of a pair of concentric sleeves, that will restore itself upon cessation of the resultant blade movement, or upon the elimination of differential movement of the sleeve to prevent any further shift of the blade pitch.

Not the least of the objects of the invention is to provide a compact and efficient device.

Further objects and advantages of the present invention will be apparent from the following description, reference being had to the accompanying drawings wherein a preferred embodiment of the present invention is clearly shown.

In the drawings:

Fig. 1 is a schematic layout for graphically illustrating the instant invention.

Figs. 2 to 5 inclusive are structural views illustrating an actual adaptation of the invention to a physical structure, and in which:

Fig. 2 is a longitudinal sectional view through the forward propeller and part of a rear propeller of a contra-rotating propeller combination, the view being somewhat as seen when viewed as indicated by the line and arrows 2—2 of Fig. 3.

Fig. 3 is a fragmentary sectional view through the forward propeller substantially as indicated by the line and arrows 3—3 of Fig. 2.

Fig. 4 is a subordinate sectional view substantially as indicated by the line and arrows 4—4 of Fig. 3.

Fig. 5 is a supplementary view in section substantially as indicated by the line and arrows 5—5 of Fig. 3.

Figure 1:
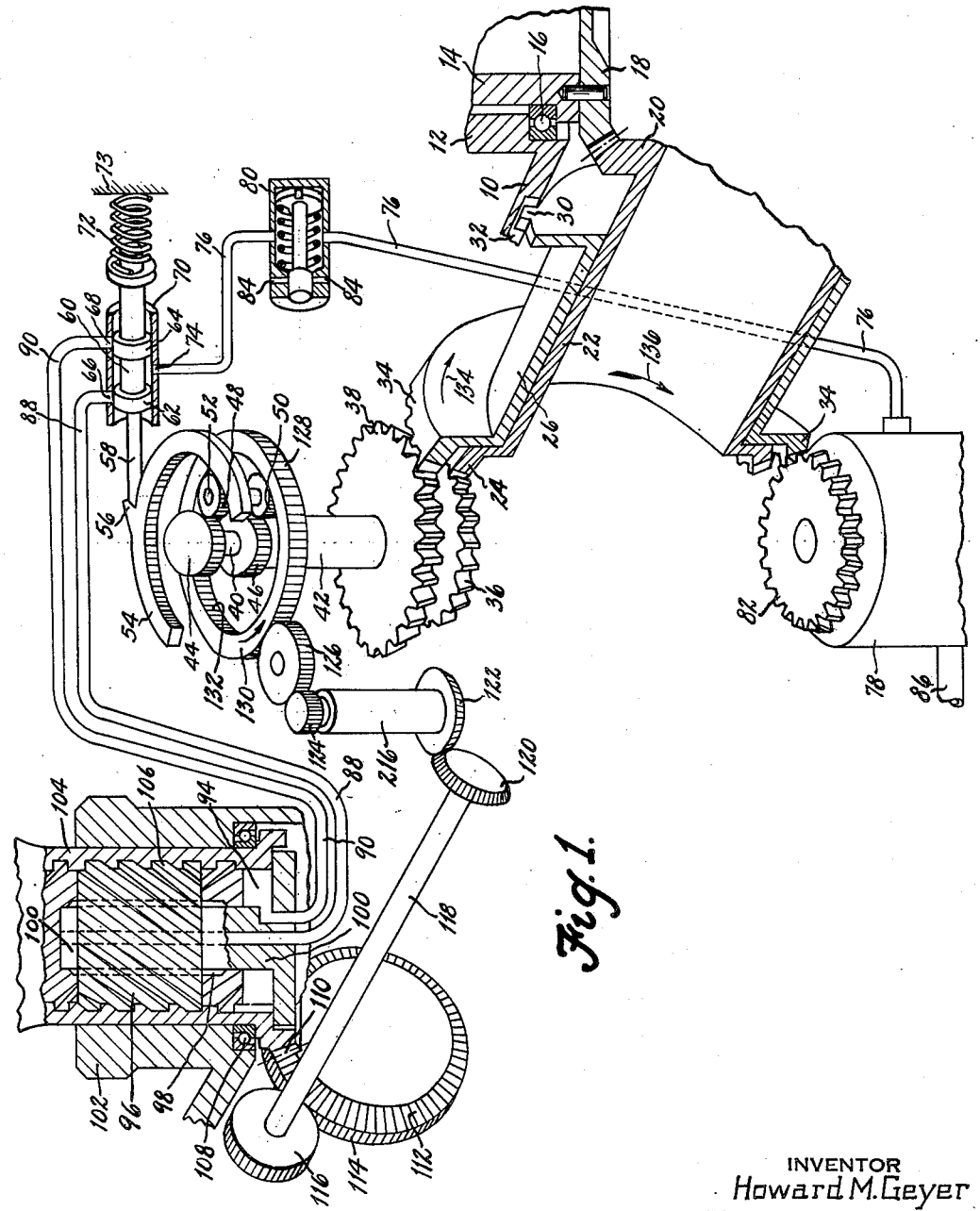

In contra-rotating, coaxial propellers, one of the many advantages is the elimination of propeller torque effect, which becomes most important when engaging in maneuvers with sudden changes of power or speed. Torque reaction or turning movements is most evident in airplanes equipped with single rotation propellers. But

2 the torque effect is not completely eliminated in the contra-rotating propeller unless the torque resulting from one of the propeller units exactly balances the torque from the other propeller component. With such an exact balance there then will be no tendency for the engine and airplane to rotate in an opposite direction to the rotating propeller, and stability of the aircraft will be more easily controlled. In contra-rotating propellers of the type where the blade shift in one propeller unit is resultant upon the change of blade setting of the other propeller unit to effect a substantially equal and simultaneous change in both propeller units, the principal problem is the prompt and faithful transmission of any blade movement in the controlling propeller to the controlling mechanism for the controlled propeller, which becomes extremely difficult where each of the propeller units are each constituted as separate operative organizations of power systems, power developing means, and power distributing or control means, completely isolated one from the other. The problem has been solved, and the difficulty has been completely overcome by means of the instant invention as hereinafter described, for which reference is first made to Fig. 1 of the drawings.

A portion of the rear propeller hub is indicated at 10 which includes a socket 12 rotatably supporting a propeller blade 14 on a bearing 16. The blade 14 may be controlled in any suitable manner to effect constant speed operation, as by the means described and claimed in the patents to Blanchard et al. 2,307,101 and 2, for which reason the blade ends in a blade gear 18 interengaging with a master gear 20 meshing with all of the blade gears for the other blades of the same hub. Thus, in blade shifting movement there is relative rotation between the parts 10 and 20 so that sleeved or other rigid extensions therefrom projecting into the front hub will take up a similar relative movement and afford a means for transmission of blade-hub relation in the rear hub to the front hub. In the present instance to effect that transmission, the master gear 20 provides a sleeve 22 surrounding the propeller shaft and ending in a gear element 24, and is surrounded by a sleeve 26 having tangs 30 retained in notches or recesses 32 provided by the hub 10, this sleeve 26 terminating at the other end in a gear element 34 concentric with the gear element 24. By that construction, relative rotation taking place between the blade 14 and the hub 10 is transmitted to the gears 24 and 34, manifesting always in retard or advance movement of the gear 24 relative to the gear 34 since the latter by its tie-in with the hub 10 always rotates with and at the same speed as the hub 10.

Constantly intermeshing with the gears 24 and 34 there are a pair of pinions 36 and 38 drivingly connected to a shaft 40 and sleeve 42 respectively, and each of which is fitted with a sun gear 44, 46 the shafts 40 and 42 being relatively rotatable. Disposed about the sun gears is a planet spider providing sets of planet gears having the planet pinions 48 and 50 meshing with and adapted to roll about the sun-gears 44 and 46 respectively. The planets are mounted in pairs, and individually rotatable on shaft elements 52 supported by the spider. The planet pinion 48 meshes with an internal ring gear 54 whose outer periphery has a cam lug 56 disposed to engage a rod or plunger 58 of a distributor valve 60. The distributor valve has a pair of lands 62 and 64 spaced to normally close off a pair of ports 66 and 68 provided by a valve cylinder 70 and within which the plunger 60 is slidable when urged endwise by the lug 56 or an opposing spring 72 based at 73.

The ports 66 and 68 are for directing fluid pressure admitted to the cylinder 70, to the blade shifting means, the pressure entering the cylinder through a port 74, by a pressure line 76 from a pump 78, which pressure line may include a pressure control valve 80. The pump terminates in a pinion 82 that meshes with the gear element 34 carried by the other hub, in such manner that counter rotation of the two hubs causes the pump gear 82 which is carried around by rotation of one hub to roll over the gear 34 and develop fluid pressure in the line 76. When the distributor valve is in the equilibrium position, such as illustrated in the view of Fig. 1, there is no differential of pressure applied to the ports 66 and 68 and in substance no flow from the line 76. The rapidly mounting pressure from the pump 78 builds up in the pressure control valve 80 which operates to relieve the pressure before it becomes dangerously high and allow the excess fluid to escape through the ports 84 and return to the reservoir from which the pump picks it up again through its intake 86. Movement of the valve member 60 in either direction from the equilibrium position connects one or the other of the ports 66 and 68 with the pressure port 74, and the other with drain-back to the reservoir.

Control passages 88 and 90 lead from ports 66 and 68 of the distributor valve and connect to chambers 92 and 94 on opposite sides of a piston 96 of the blade shifting means, the piston 96 in response to pressure application to either chamber 92 and 94, sliding along the straight splines 98 of a hub spindle 100 to effect rotation of the blade 104 within the socket 102, due to the helical spline engagement 106 between the exterior of the piston and the interior of the blade 104. The blade 104 here also rotates on bearings 108 carried by the front hub socket and terminates in a blade gear 110 meshing with a master gear element 112 also meshing with all of the other blade gears of the same hub. The master gear element 112 includes a spur gear portion 114 intermeshing with a transfer pinion 116 on a shaft 118 driving a gear 120, which in turn drives a gear 122 drivingly coupled with a pinion 124 meshing with an idler 126 maintained in driving relation with an exterior train of teeth 128 on a double ring gear 130 whose inner train of teeth 132 mesh with the planet pinion 50 above referred to.

By this means any differential rotation effected between the shafts 22 and 26 is translated into movement of the valve member 60 with respect to its guiding sleeve 70, and if either of the ports 66 or 68 are open to the port 74 an application of pressure will be made to either one of the chambers 92 or 94 with a consequent movement of the piston 96 and rotation of the blade 104 within its socket. The relative movement between the blade and hub in the forward propeller component effects rotation of the master gear 112 and the transfer gearing thereto connected that moves the ring gear 130 in that direction proper to permit proportionate retraction of the ring gear 54 and recovery of the distributor valve, that it may again assume the equilibrium position. During equal rotation of the two sleeves 22 and 26, which is the condition that obtains while the propellers are operating without any pitch shift, both gears 36 and 38 are driven at equal speed, and consequently the sun gears 44 and 46 which are of the same diameter rotate at equal speeds to drive the planet pinions 48 and 50 at equal speeds. Those planets being of equal diameter and driven at the same speed will thereby revolve about the shafts of the sun-gears by rolling inside of the ring gears 54 and 130 without producing any relative movement between the two ring gears. There being no relative movement between the ring gears 54 and 130, then there is no movement of the valve 60 relative to its casing 70, and no introduction of pitch shift.

Assuming that there is such pitch shift of the blades of the rear propeller component as to cause the sleeve 22 to advance in rotation relative to the rotation of sleeve 26, then that relation will be transmitted to the distributor valve substantially as follows. The arrow 134 indicates the direction of rotation for the sleeve 26, while the arrow 136 with the single feather indicates the advancing rotation or lead of the sleeve 22 over the rotation of the sleeve 26. The rotation of both sleeves is in the same direction, but the sleeve 22 is by its advance rotating faster than the sleeve 26. It is apparent from this that the gear elements 36, 40, 44 and 48 are then advancing or rotating faster than the associated gear elements 38, 42, 46 and 50. The planet pinions 48 and 50 being independently rotatable on their separate shafts though carried by the same spider are capable of rotating at different speeds and according to the speeds of the sun gears 44 and 46 which drive them. Thus advance rotation of the sun gear 44 causes the pinion 48 to rotate faster than the pinion 50, and because both pinions are carried by the same spider, the ring-gear 54 is moved so as to push the distributor valve 60 toward the right hand against the spring 72. That movement of the valve opens the port 68 to the pressure port and the port 66 to drain out the end of the cylinder 70. Directly that fluid pressure is applied to the line 90 the piston 96 moves outwardly to rotate the blade 104 with its blade gear 110 whose movement is picked up by the transfer gearing and transmitted to the double ring gear 130, moving it in the direction of the single feathered arrow. That movement of the ring gear 130 causes the spider supporting the planets to revolve about the sun gears a little faster which causes the planet pinion 48 to retract the ring gear 54 until the valve 60 is returned to its equilibrium position by the spring 72, thereby cutting off any further distribution of pressure fluid to the line 90. A retarded rotation of the sleeve 22 relative to the sleeve 26 may be similarly traced for effecting an opposite pitch shift of the blades in the propeller component.

The physical embodiment of those principles is shown in detail by Figs. 2 to 5, where two concentric and oppositely rotating propeller shafts 140 and 142 extend from the usual engine nose (not shown) and engage an intershaft bearing 144, the shaft 140 stopping short at the bearing 144 for support of the rear hub 10 and blades 14, while the shaft 142 extends forward to support the hub 146 and blades 104. Both propeller assemblies or units are substantially duplicates of one another except for the details of structure identifying them as the forward and rear propeller and rotating in reverse directions. Both propeller units are mounted on their respective shafts in the same manner to the extent that both hubs provide a rearward sleeved extension 148 for the mounting of a regulator 150 housing control apparatus to shift the respective blades, the extension 148 engaging a wedge ring 152 seating against a collar or shoulder 154 where they are held by the usual front cone 156 and shaft nut 158 locked against turning or loosening by snap ring 160. The hub and shaft are cooperatively splined at 162 to provide a driving relation.

The regulator 150 provides the structure characterised in the Blanchard Patent 2,307,102 heretofore mentioned, but here provides an annular member 164, having a pair of concentric flanges 166 and 168, mounted on the hub extension 148 where it is held by a sleeve nut 170, and forms a structural support for a pair of drawn or stamped metal flanged rings 172 and 174 cooperating to provide a sealed chamber 176 housing the propeller control apparatus and pressure medium. These flanged rings are bonded together at 178 and secured to the peripheral edge of a reinforcing ring 180 whose inner boundry engages a race member of a bearing 182. The other edges of the flanged rings are bonded to the annular member 164 as indicated at 184 and 186 thereby fabricating the annular sealed chamber 176. The inner race of the bearing 182 is supported by the sleeve 26, which in turn is journalled on the sleeve 22 here drivingly connected with the master gear 20 of the rear propeller by a keyed or tongued slip joint 188. Extending from within the sleeve 22 there is an adapter sleeve 190 that engages a seal ring 192 carried by the annular member 164 and thereby provides a gear casing or chamber 194 bounded by the annular member 164, the sheet metal member 174, the reinforcing ring 180, the bearing 182, the gear elements 24 and 34, and the adapter sleeve 190.

The peripheral wall of the reservoir is apertured at appropriate places to permit the insertion of mounting blocks or socket members 196 there bonded to the wall of the reservoir to perfect the seal of the chamber as indicated at 198, and within the reservoir the tubage connections for the passages 76, 86, 88, and 90 are permanently made to the sockets as indicated at 200, while the interior of the socket members are appropriately channeled or drilled to make connection with the control elements 78, 80 and 70, each of which are mounted firmly on selected ones of the socket members in sealed relation by means of the screw devices 202. The control devices are thus accessible from the exterior of the regulator for adjustment, replacement or repair, while the intimate fluid connections to the system and one with another is wholly contained within the reservoir. For such control elements as the pump 78 and the coordinating mechanism having a driving gear in the gear casing 194, there is provided a shaft housing 204 extending across the annular chamber of the reservoir with bonds at each end to the wall members so as to perfect the seal of the reservoir 176.

Specifically, the physical structure and details of mounting of the coordinator are illustrated in Figs. 2, 3, and 4, where the tubular housing 204 supports at either end a bearing member 206 within which are contained the two shafts 40 and 42. These shafts may be slip-jointed for purposes of ready removal of the gear train from the outside of the reservoir. It will be observed that here the gear train is enclosed by a cap member 208 secured on the outside face of the mounting block 196, and that the planet gears 48 and 50 are rotatably mounted on a spider plate 210 journalled about the shaft 40 extended and situated between the sun gears 44 and 46. The ring gears each have a cylindrical flange that telescopingly engage one within another as indicated at 212. The cap 208 also provides a cylindrical boss 214 that houses the porting sleeve 70 and the spring 72 engaging the plunger 60, the interior of the boss having a drain passage leading to a passage in the block 196 and thence returning to the reservoir so that fluid escaping from either end of the porting sleeve 70 by way of the ports 66 and 68 may be again taken up by the pump and recirculated.

As indicated by Figs. 3 and 4, the gearing between the double ring-gear 130 and the gear 122 are housed in the regulator and in part by the cap 208. A tubular housing member 216 extends from the block 196 across the reservoir 176 to end in the gear housing 194 for journalling a shaft connecting the gears 122 and 124, the gear 122 being situated in the gear casing where it is engaged by the gear 120 driven by the shaft 118. The shaft 118, as shown in Fig. 2, extends through a hub bore 218 to the forward end of the hub where it adjustably receives a driving gear 116 receiving impulse from the master gear 112 by way of the spur 114. An end fixture comprising a lock ring 220 and a bearing support ring 222 complete the end of the forward hub and provide anchorage of an anti-friction bearing 224 for the master gear 112 and channels for the spur 114. An adjustment device 226 is also provided for altering the angular relation between the shaft 118 and the gear 116 that affords timing or tracking by an initial adjustment between the blade position and the position of the distributor. That affords adjustment for the two propellers so that they may always occupy the same angular setting, or for predetermining the angular difference of setting where that is desired for any reason.

In the structural embodiment the hub 146 embodies a boss 228 at the bottom of and concentric with each blade socket where a preload bearing 230 cooperates with the usual stack bearings 108 to pivotally support the blades 104. The chambers 92 and 94 separated by the piston 96 are embodied in a torque unit comprising a cylinder 232 with one closed end 234 and a flange 236, the latter being secured to the blade gear 110 and doweled by pin 238 to the end of the blade. The interior of the cylinder provides the spiral splines 106 engaging the piston which has a skirt for the purpose, and the interior of which is helically splined to the spindle 100 which here is tubular and firmly secured to the hub boss 228 where it is held by a tubular nut 240 supporting a tube 242 on which the piston slides. Through the tube 242 the chamber 92 is always in communication with a pocket 244 in the hub boss 228 from which extends a conduit 88 to connect with a pocket 248 in the annular ring 164 of the regulator, and to which pocket one of the distributing lines 88 or 90 communicates. The details of this fluid connection are shown in Fig. 5, and it will be appreciated that a similar means is used for connecting the other of the distributing lines with the conduit 250 and drill way 252 leading to the chamber 94.

While the embodiment of the present invention as herein disclosed, constitutes a preferred form, it is to be understood that other forms might be adopted, all coming within the scope of the claims which follow:

What is claimed is as follows:

1. In a dual rotation propeller assembly, having a pair of self-contained oppositely rotating propeller components, with means in one of said propeller components for controlling the blade pitch thereof in accordance with the blade pitch of the other propeller component, the combination wherein the means controlling the blade pitch include an annular sealed reservoir concentric with the propeller hub to rotate therewith and enclose a fluid pressure medium, a gear casing encircled by the annular reservoir, tubular housing members radially disposed to extend through the annular reservoir to connect the gear casing with the periphery of the reservoir, a fluid pressure pump and a coordinating unit each mounted on the periphery of the reservoir and each having shaft means with bearings extending inwardly through the tubular housing members to end in the gear casing, differential rotative means extending from said other component into said gear casing and engaging the shaft means of said pump and coordinating unit to translate blade shift movement of said other component to the coordinating unit, said coordinating unit providing means for distributing the pump developed pressure medium of the said one component to effect a like pitch shift in the said one component.

2. In a dual rotation propeller assembly, the combination comprising, a pair of self-contained oppositely rotating propeller components, one of said propeller components enclosing a pump, a distributor valve and pressure actuated motors for shifting the blade pitch of that propeller component upon application of a control signal, an annular reservoir rotatable with the said one component and providing a fluid medium for the distributor valve and pump, means for mounting the pump and distributor valve on the outer periphery of the reservoir, means spacing the reservoir radially from the propeller hub to provide a gear casing surrounded by the reservoir, housing members extending radially through the reservoir to enclose drive shafts for the pump, and a coordinating unit providing a gear train including a cyclical gear unit having a pair of input gears for actuating the distributor valve, and a pair of output gears within said one propeller component, extending from said other propeller component and differentially actuated from the shifting blade of said other propeller component for controlling the cyclical gear unit.

3. In a dual rotation propeller assembly, having a pair of self contained oppositely rotating propeller components, one of said propeller components including a fluid pressure pump, a fluid pressure distributing valve and fluid pressure motor means operable to shift the blade pitch thereof in response to an impulse from the other propeller component, the combination wherein a torroidal reservoir encloses a fluid medium for the control means, a gear casing inwardly concentric with the reservoir, sockets on the periphery of the reservoir for mounting the pump, and distributing valve, impulse applying means extending into the gear casing for operating the pump and including a pair of concentric sleeves extending from the said other propeller component and subject to differential rotation upon blade pitch change in the said other propeller component, a coordinator mounted in one of the sockets and including a cyclic gear train coupling one of the concentric sleeves for operation of the distributor valve in response to blade movement in said other propeller component, a second cyclic gear train operatively coupled with the first said cyclic gear train, and gear means disposed between the fluid pressure motor means and the second said cyclic gear train for retracting the distributor valve when the shift of blade pitch in the said one propeller component equalizes the pitch change made in the said other propeller component.

4. In a dual rotation propeller assembly, one propeller component including a fluid pressure pump, a fluid pressure distributing valve and fluid pressure motor means operable to shift the blade pitch thereof in response to a predetermined impulse, a regulator rotatable with the said one propeller component and providing concentrically arranged sealed annular reservoir and gear casing, said reservoir enclosing a fluid pressure medium and fluid passages connecting the pump, the distributor valve and motor, a tubular housing extending radially across the reservoir and opening into the gear casing, cyclic gear means carried by the regulator for actuating the distributor valve including concentric shafts in said tubular housing, concentric sleeves extend from another propeller component into said gear casing and having geared connections with said concentric shafts for controlling the operation of said cyclic gear means, whereby blade shifting movement of the said other propeller component will effect movement of the distributor valve of said one propeller component.

HOWARD M. GEYER.

REFERENCES CITED

The following references are of record in the file of this patent:

UNITED STATES PATENTS

| Number | Name | Date |
|---|---|---|
| 2,307,101 | Blanchard, et al. | Jan. 5, 1943 |
| 2,307,102 | Blanchard, et al. | Jan. 5, 1943 |
| 2,362,444 | Blanchard | Nov. 14, 1944 |
| 2,367,230 | McCoy | Jan. 16, 1945 |
| 2,421,514 | Martin, et al. | June 3, 1947 |

FOREIGN PATENTS

| Number | Country | Date |
|---|---|---|
| 50,162 | France | Jan. 17, 1940 |
| | (Addition to 844,832) | |
| 483,760 | Great Britain | Apr. 26, 1938 |